United States Patent [19]

Carlisle

[11] 4,437,264
[45] Mar. 20, 1984

[54] HYDROPONIC APPARATUS AND METHOD

[76] Inventor: Richard S. Carlisle, P.O. Box 307, Rye, N.Y. 10580

[21] Appl. No.: 368,398

[22] Filed: May 25, 1982

[51] Int. Cl.³ .................... A01B 79/00; A01G 31/00
[52] U.S. Cl. .......................................... 47/58; 47/62; 239/407
[58] Field of Search ............................. 47/61, 62–64, 47/59, 79, 17, 58; 239/407, 398

[56] References Cited

U.S. PATENT DOCUMENTS

| | | | |
|---|---|---|---|
| 2,062,755 | 12/1936 | Lyons et al. | 47/62 |
| 3,660,933 | 5/1972 | Wong, Jr. | 47/62 |
| 4,245,433 | 1/1981 | Sjostedt et al. | 47/62 |
| 4,300,311 | 11/1981 | Marchant | 47/62 |
| 4,324,069 | 4/1982 | Flagg | 47/62 |
| 4,334,386 | 6/1982 | Burcombe et al. | 47/62 |

Primary Examiner—E. H. Eickholt

[57] ABSTRACT

The method of supplying nutrient liquid to a plant growing system comprising a series of many planters that are essentially alike and that are disposed at a common level, the system including a supply line extending from a supply point to the planters in succession, including the steps of first supplying a first nutrient liquid to the supply line at the supply point under pressure so that the planters receive nutrient liquid to progressively lower levels in relation to their distances from the supply point due to attenuation of pressure along the supply line, interrupting the supply of liquid for equalizing the levels of liquid in the planters, thereafter supplying a second nutrient liquid different from the first at the supply point so that the planters receive such second nutrient liquid to progressively lower levels in relation to their distances from the supply point, and interrupting the supply of the second liquid for equalizing the levels of liquid in the planters, thereby to develop a range of different nutrient liquids in the successive planters.

4 Claims, 7 Drawing Figures

HYDROPONIC APPARATUS AND METHOD

The present invention relates to systems of interconnected hydroponic planters and to methods of filling such planters. The invention also relates to liquid couplings useful in such hydroponic systems, these couplings also having more general application.

In my above-identified copending application, there is disclosed a form of hydroponic planter including a large container or reservoir for hydroponic liquid. This is water containing dissolved fertilizer. That planter includes a small pot as of peat moss ("peat pot") containing soil or similar material supported above the liquid in the reservoir. Developing roots of a seedling in the peat pot spread through the soil and through the walls of the peat pot. The developing roots hang down through an air space and into a supply of hydroponic liquid.

The peat pot is supported at the top of the liquid container. Thus, the pot and its support constitute a means for supporting a plant. High humidity develops in the space between the plant support that also serves as a closure.

The leaves of the plant give off moisture drawn from the liquid in the reservoir, so that the liquid level drops with passing time. When the plant is small, the level of liquid can be high but as the plant matures and roots develop prolifically, the level of liquid should be allowed to drop. Fine roots are exposed to the highly humid air in the space above the level of the liquid while other roots trail into the liquid.

Pursuant to an important object of the present invention, many such planters have been interconnected and used with great success to raise tomatoes and other crops. The liquid containers or reservoirs of the planters are connected to a filling tank by a system of pipe or tubing. The bottom of the supply tank is higher by about three feet in an example, than the desired level of liquid in the planters. A long main line of pipe or tubing extends from the tank along the planters, and an individual branch line of tubing extends from the main line to the hydroponic liquid container of a respective planter. All the planters are of like dimensions and their bottoms are supported at a common level, a hothouse floor, for example. The connection of the main line to each branch tube forms a primary flow-inhibiting constriction. The connection of the branch tube to the planter also restricts the fluid flow. The flow-retarding effect of the branch-line tube and its constrictions inhibits overflow of the planter nearest to the supply tank, while enabling all the planters to be filled ultimately to a desired level in a relatively fast filling process.

As the planters fill with liquid, the planter nearest the tank or the supply end of the line ("the nearest planter") can be filled above the desired level. As liquid rises in the nearest container, the liquid in the rest of the series of planters rises to progressively lower levels due to a progressive drop in pressure along the main supply line. In an exemplary filling procedure, filling is interrupted when the planter nearest the supply tank has been over-filled as much as can be tolerated. Many other planters of the series have been over-filled in varying degrees. Many of the planters remote from the supply tank have not yet been filled to the desired level.

The liquid level in all the planters is then allowed to equalize. In this operation, liquid from the "over-filled" planters drains into the main line and continues the filling of the "underfilled" planters.

If the equalized level is below that desired, the filling and equalizing steps can be repeated. The amount of liquid needed in the tank for the additional filling can be estimated with reasonable accuracy.

The branch-line constrictions are advantageously moderate (not severe) so that the initial filling step and the ensuing step of equalizing the liquid levels are not unduly protracted even when many planters are distributed along the main line.

The over-filling and equalizing steps may also be utilized in realizing a further object of the invention, to develop a graduated distribution of fertilizer concentrations along the series of planters at the start of a growing period. This is achieved by a novel procedure detailed below. The optimum concentration can be determined after a period of time by noting the planter(s) in the series along the main line bearing the best-developed plant(s). By that time the liquid level in the planters will have dropped substantially. The fertilizer concentration in most of the liquid containers can then be made more nearly optimal by adding liquid with greater or reduced fertilizer concentration or with pure water, as appropriate, in a further sequence of filling and equalizing steps.

A further object of the invention resides in providing novel connections or couplings from the main line to the branch lines. For practical reasons, it is important to provide a quickly assembled, dependable form of connection in the branch lines between the main line and each of the planters. This novel form of connection also has general application. More specifically, the novel form of connection can be proportioned to develop a desired amount of constriction, either slight or prominent. In one procedure, a short length of yieldable plastic tubing or a stub having a slant-cut end is forced into an undersized hole in the main-line pipe or tube. The hole in the wall of the main line is flared or tapered conically, being largest in diameter at the outside surface of the main-line tubing. The tube is forced into the tapered hole. A tube with a slant-cut end may also be forced through an under-sized hole in the wall of the planter's liquid container. The tube to be inserted is relatively stiff, yet it is softer than the main-line pipe or tube. As a factor of importance separately, even if the pipe were not hard, it is thicker than the wall of the stub and it encircles and grips the stub. That geometry favors forming a constriction in the stub. In this way, the desired branch-line connections to the pipes are made quickly and economically and desired constrictions are produced at those connections.

The nature of the invention in its various aspects will become clear and will be more fully appreciated from the following detailed description of an illustrative embodiment of the invention in its various aspects.

Figure 1:
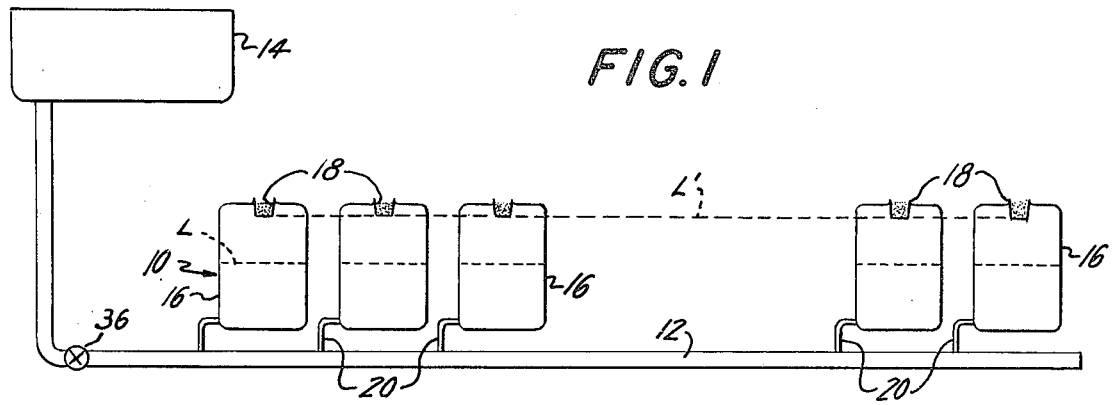
FIG. 1 represents an elevation of a liquid-distribution system for a series of hydroponic planters.
Figure 2:
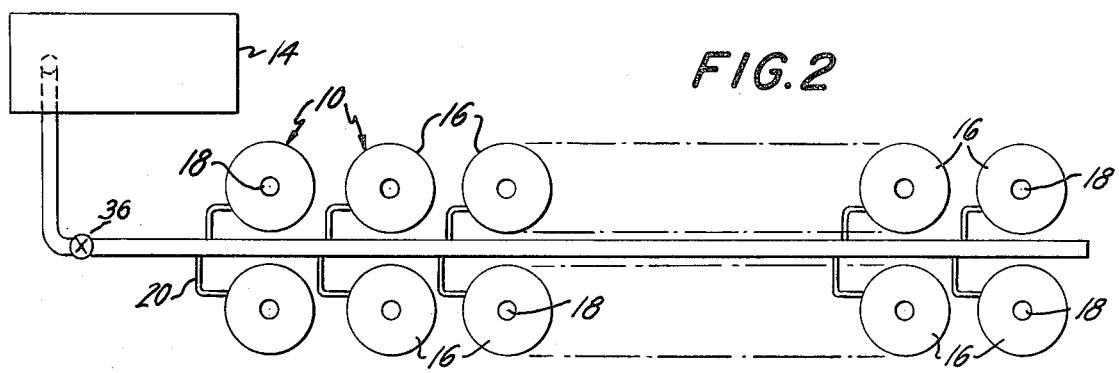
FIG. 2 is a plan view of the system of FIG. 1.
Figure 3:
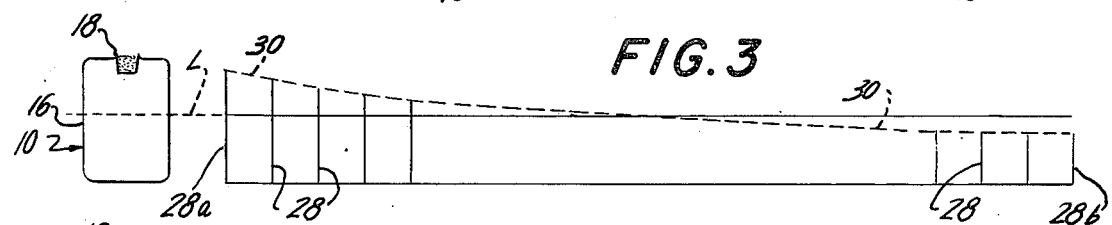
Figure 4:
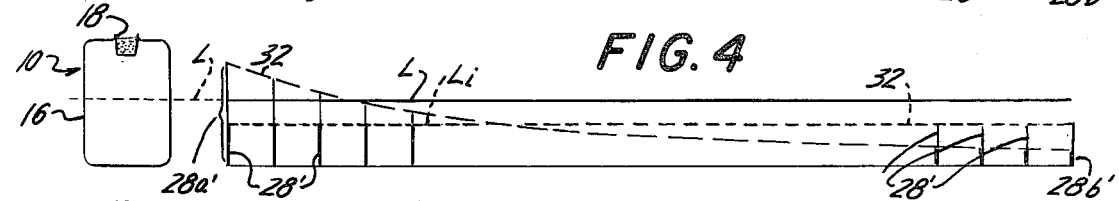
Figure 5:
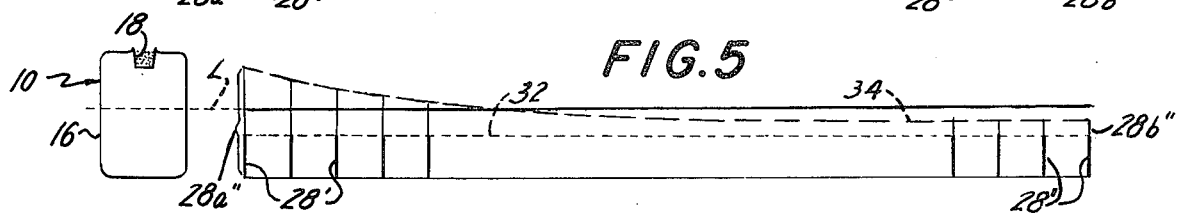
Figure 6:
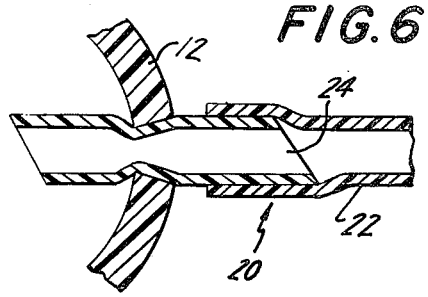
Figure 7:
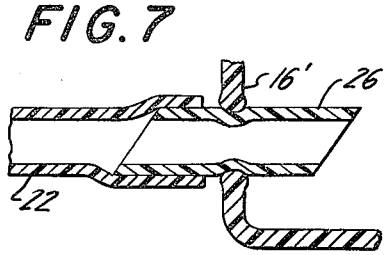

FIGS. 3, 4 and 5 are graphs representing filling levels of the planters connected as in FIGS. 1 and 2, each of FIGS. 3, 4 and 5 including a planter with a dotted line representing the desired liquid level at equilibrium of the system;

FIG. 6 is an enlarged fragmentary cross-section at a plane extending along an inserted tube and across a main-line tube; and FIG. 7 is an enlarged fragmentary cross-section of a branch-line connection to the liquid container of a planter.

In the drawings, many hydroponic planters are shown supported at a common level and distributed along a main liquid-supply line or conduit 12, which may be pipe or tubing. The planters are shown in a two-row arrangement but, of course, the number of rows served by any one main line can be varied as desired. The main line extends to a supply tank 14 that is raised above the common suppport level of the planters which may rest on a level floor. In an example, the bottom of the tank is three feet above the highest desired equilibrium level L of hydroponic liquid, being the level established when the plants are only seedlings or germinating seeds.

Planters 10 are alike in that they have liquid containers 16 of equal capacity and proportioned alike, and in that they have covers receiving plant-supporting pots 18. These pots or containers of soil or like material through which roots can develop, have details of construction set forth in my U.S. Pat. No. 4,179,846 incorporated by reference. The plant supporting containers are supported with their bottoms at a common level L' above level L. As an alternative, one or more plants may extend through apertures in the cover of the planter, with leaves or both a stem and the leaves above the cover and the roots trailing to the hydroponic liquid. The cover itself then forms the plant supporting means.

Pots 18 are advantageously formed of pressed peat moss which accommodates root penetration and enlargement, and they form closures for the openings in the reservoir covers. Consequently the air space between levels L and L' becomes 100% humid. A small air space (top to bottom) may be suitable for seedlings, but a larger air space may be desirable for plants with more fully developed root systems. Fine hair-like roots tend to develop in the humid air space. Exposure of such roots to humid air is usually considered highly desirable in hydroponic plant culture.

Each liquid container 16 (which at times is referred to below as if it were the whole planter) is connected to the main line 12 by branch line 20.

A highly effective, quick and economical form of connection between the main line 12 and the branch line to each planter is shown in FIG. 6. Branch-line tube 22 fits tightly over a tubular stub or tube 24 that has slant-cut ends. Stub 24 extends into main-line tube 12 through a hole whose diameter is less than the unrestrained diameter of stub 24. Moreover, the hole has a conical taper, being largest in diameter at the outside surface of tube 12.

The slant-cut ends of stub 24 facilitate forcible insertion of stub 24 into tube 22 and into main-line tube 12. The conical taper of the hole in main-line tube 12 additionally facilitates forcible insertion of stub 24 into tube or pipe 12. The coupling shown in FIG. 6 can be quickly assembled, and the assembly requires no tools whatever. Particularly in a large hothouse that shelters many planters (for example one to two thousand planters, with one to two hundred planters along a main line) it is important to adopt a form of secure and watertight connection that can be quickly made by hand.

The illustrated form of connection has a further feature that contributes to success of the planter system of FIGS. 1 and 2, namely, it develops a constriction that contributes toward rapid but not too-rapid filling of the containers. Tube or pipe 12 that is tight against the outside of hollow stub 24 tends to impose forces on tube or stub 24, producing a prominent constriction in the stub. This effect is enhanced by the substantial wall thickness of tube 12 and it is further enhanced by using softer material and a much thinner wall for stub 24 than for pipe or tube 12. In an exemplary system, stub 24 is made of plastic tubing having a Durometer hardness of 80–100 used with a tube or pipe that is much harder, essentially rigid. In an example, pipe 12 is of 1-inch O.D. rigid PVC having a wall thickness of $\frac{1}{8}$", tube 24 is 0.138-inch O.D. and 0.020 wall thickness. The hole in pipe 12 that receives tube 24 has a 0.125-inch minimum diameter and is flared out to about 0.138-inch. As a result, after stub 24 has been pushed into place and becomes further deformed after a short time, a secure connection develops. It resists a 50-pound pull test.

FIG. 7 shows the coupling of each branch line 20 to the liquid container 16 of a planter. The end of tube 22 remote from line 12 fits over a stub 26 of plastic, advantageously identical to stub 24. Container wall 16' is of somewhat softer material than stub 26, e.g. 1/16" thick high-density polyethylene. Stub 26 extends into liquid container 16 close to its bottom. This hole (e.g., 0.125-inch dia.) is smaller than the normal outside diameter of stub 26 (e.g., 0.138-inch dia.). The wall 16' of the container tends to become deformed somewhat as shown, but it provides a secure, water-tight connection between the container wall and the tube or stub 26. A modest constriction develops in tube 26. The connection resists a 20-pound pull test.

The constriction formed in stub 24 provides the main factor impeding flow of liquid in each branch-line connection 24-22-26 between the main line 12 and a liquid container 16. For simplicity, the constrictions of the branch-line connections of all the planters are formed alike, and impede the flow of liquid alike under equal conditions of applied pressure.

Due to the flow of water along main line 12, which may have a bore of about $\frac{3}{4}$-inch diameter and may supply 100 planters for example, there is a drop of pressure along the line. Due to that factor, the planters closest to tank 14 tend to fill more quickly. The restrictive effects of the branch lines tends to retard filling of all of the planters, but the planters farthest from the supply tank fill slower than those nearest to the supply end of the line. If the constriction at stub 24 (FIG. 6) were made severe, all the planters would fill at virtually the same rate, but filling would then take a long time.

A further factor helps in making the filling rates of all the planters more nearly equal, namely the Bernoulli effect. As fluid passes across an orifice, it tends to decrease the static pressure in the orifice. In pipe 12, the hydroponic liquid passes across the open end of each stub 24. This produces a drop in pressure that partly reduces the static pressure developed by elevated tank 14. Since the velocity of the liquid is greatest for the branch lines of the planters nearest tank 14, the Bernoulli effect compensates for part of the progressive drop in hydraulic pressure that develops at the branch-line connections of the planters along the main line.

FIG. 3 diagrammatically shows a graduated range of varying levels of fill that occur when the constrictions in the branch lines are such that the maximum fill level that can be accepted (ultimately, overflow) does not occur until approximately half the planters have been filled to the desired level L. Each vertical line 28 represents the height of fill in a planter, where the interconnected planters are distributed along the main line. Line 28a represents the fill of the planter nearest the supply tank and line 28b represents the fill of the most remote planter. Line 28a represents the maximum tolerable fill ("overfill" above level L), and in an example it is of the order of two or three inches above level L. When this condition is reached, the supply of hydroponic liquid is interrupted. The fill levels 28 at this time vary among the planters along the main line as represented by broken line 30.

The level-equalizing phase follows. Liquid from the planters that were "over-filled" drains into line 12 and enters the under-filled containers, those whose fill did not reach level L.

The constrictions can be made larger to promote faster filling from the supply tank and faster equalizing flow. In that case (FIG. 4) the "nearest" planter reaches its maximum 28a' at a time when the remote planter has only a small part of the desired fill. Relatively few planters have been filled above level L. Filling is interrupted, to allow for equalization. This process of filling the planters initially to graduated levels is quickened, because the constrictions are less severe as compared to those in the system of FIG. 3 where they are proportioned for one-step filling. The process of equalizing the graduated fill levels 32 in FIG. 4 to level Li is also expedited as compared to equalizing in the system of FIG. 3. That is because of the lesser constrictions in the branch lines, and for the further reason that the "overfill" level is higher above the equalization level Li in FIG. 4 than above level L in FIG. 3. Lines 28' represent the equalized levels in each planter.

To bring the fill level from its condition in FIG. 4 to uniform fill at level L, a renewed filling sequence is carried out as shown diagrammatically in FIG. 5. An excellent procedure for a renewed filling sequence can start by estimating or calculating the total volume of liquid needed for all the planters to raise levels 28' to level L. That volume of liquid is delivered into tank 14. With experience and proper calculation, it will not exceed the acceptable maximum for the "nearest" planter when the tank has emptied. A graduated range of fill among the planters represented by line 34 develops, whereupon the supply of hydroponic liquid is used up. Equalizing flow ensues to leave all the planters filled to level L, to a close approximation.

In a modified routine for filling the planters initially, the flow may be interrupted at intervals each time the level in the nearest planter has risen to a differential level substantially above the level in the most remote planter, for example a differential of 5 inches for 15-inch high planters. Equalizing flow occurs during the interruption. It is unnecessary to wait for full equalization to develop, i.e., uniform fill levels in all of the planters. Filling flow can be started again when the differential of liquid levels diminishes from 5 inches to $2\frac{1}{2}$ inches, for example.

In the foregoing filling procedures, the final filling level L is typically 3 to 5 inches below the plant supporting means. That may not be suitable for hydroponic culture of some plants that require the level L to be closer to the plant supporting means, $\frac{1}{2}$ inch, for example. In that event, the filling procedures as described above may be followed for filling the planters rapidly until the liquid level reaches 3 to 5 inches from the plant supporting means. Thereafter, valve 34 is closed partially to raise the level of the liquid slowly in all the planters to the desired level without danger of overflow of the nearest planter.

The optimum concentration of dissolved fertilizer in the liquid may not be known, partly due to the difficulty of compounding successive batches of fertilizer with the same nutritive value. Even with consistent formulation of the fertilizer, the optimum concentration for given growing conditions may not be known. The optimum concentration of fertilizer can be determined in the following fashion.

A first filling sequence is carried out as in FIG. 4, deliberately using less-than-optimal fertilizer concentration and limiting the fill to level Li. Then a further filling sequence is carried out as represented in FIG. 5, using greater-than-optimal concentration of dissolved fertilizer. The "nearest" container receives a total fill 28a comprising previous fill 28' plus a large proportion of enriched liquid. This effect is graduated along the planters. After equalizing flow takes place, the "nearest" planter will have the richest fill.

During the ensuing period of plant development, the level of liquid in the planter drops because water vapor is given off by the leaves. Eventually more liquid must be added.

Concentrations of fertilizer dissolved in the liquid are graduated along the series of planters due to the foregoing filling procedure. Those concentrations correspond to the electrical resistivities of the liquids. Resistivities of the liquid in the planters can be measured and recorded initially, and/or the resistivities may be measured after a period of plant development, two to three weeks for example. At the end of that period of plant development, the plants should be inspected and, assuming that an appropriate range of concentrations was adopted initially, the plants exhibiting the best growth will occur somewhere along the series of planters. In an example, there may be 100 planters along one main line. Ideally, the optimum concentration should be used thereafter in all the planters. Knowing the electrical resistivity of the liquid in the planter or group of planters exhibiting optimum plant development, one can estimate the resistivity of the liquid that should be added to the series of planters for developing nearly uniform fertilizer concentration in the series of planters at approximately the optimum value.

Reasonably uniform fertilizer concentration may be realized by adding hydroponic liquid generally in the manner represented in FIG. 5. The amount of added hydroponic liquid should be limited to provide an equalized liquid level below level L, because the plants at this stage are developed and more air space above the liquid should be allowed than was provided previously for the seedlings. For example, the concentration of fertilizer in the liquid to be added may be calculated to yield the optimal concentration in the "nearest" and its neighboring planters at the new equalized filling level. The concentration of fertilizer in the added liquid should be less than the optimum concentration, so that after the newly added liquid "overfills" the "nearest" planter of the series ("overfill" in relation to the newly adopted equalized level) it will dilute the liquid previously contained in that planter to yield a close approximation of the optimal concentration. Plain water may prove to be appropriate, the ultimate limit of dilution.

After the diluting liquid has been added as in FIG. 5, the overfill of the "nearest" planter and the overfills of the neighboring planters are allowed to drain via the main line into the underfilled planters of the series until the liquid levels are equalized.

The averaging of fertilizer concentration that occurs in the "nearest" planter also occurs in other planters along the series. The concentrations in the planters vary progressively along the series before diluting liquid is added. That variation is largely undone in the series of planters as a result of adding the concentration-adjusting liquid to the system. The process develops essentially uniform concentration of fertilizer at the optimal level in the planters "upstream" of the planter that exhibited best plant development, the "best" planter. The planters downstream of the "best" planter are affected only slightly by the process, and their initial fill was only slightly lower in concentration than that of the "best" planter.

More exact results may be realized by executing two sequences of concentration-adjusting steps, adding the concentration-adjusting liquid as in FIGS. 4 and 5. It should be remembered that when the concentration-adjusting procedure has been completed, there should be a suitably large air space above the liquid for the plants that are well developed at that stage.

In the first phase of the concentration-adjusting procedure (per FIG. 4) the concentration of fertilizer used may be dilute, yet higher than that needed to develop optimal concentration in the "nearest" planter. Both as a result of the initial filling procedure and after the first adjustment fill, the "overfilled" planters of the series contain greater-than-optimal concentration of fertilizer. As their "over-fill" drains into the main line, it enters planters remote from the supply tank until the levels become equalized. In this process, the planter that develops optimal fertilizer concentration is a planter farther from the supply tank than the planter observed as having produced best plant development. The concentration-adjusting effort could end at this point, leaving the "nearest" planter and its neighbors at slightly greater-than-optimal concentration and with improved concentration in the other planters downstream of the "best" planter.

In a renewed filling operation (as in FIG. 5 following FIG. 4 but aimed at ending with suitably large air spaces), the concentration of fertilizer in the liquid added to the system may be that needed to develop optimal concentration in the "nearest" planter. This step would have the effect of reducing only slightly the concentration in the planters remote from tank 14, but that concentration may still be a close approximation of the optimum.

As a further variant, the initial gradient of fertilizer concentrations along the series of planters as described above may be reversed. This may be done by first introducing a quantity of liquid deliberately having a greater-than-optimal fertilizer concentration (FIG. 4) followed by addition of water or low-concentration liquid (FIG. 5) and then allowing a long period for plant development. The "nearest" planter to the filling source will have less-than-optimal concentration, and the one having optimal concentration will be somewhere between the ends of the series. After the growing period and identification of the "best" planter, concentration-adjusting liquid would then be added in any of the procedures described above. However, in this case liquid with greater-than-optimal fertilizer concentration would be used.

Economical management of a hydroponic "farm" having many separate planters containing hydroponic liquid depends on an effective liquid supply system that can be created in a cost-effective way. The forms of coupling shown in FIGS. 6 and 7 contribute importantly to economy since they facilitate secure assembly of the system with a minimum of labor and minimal cost of fittings. In case a diseased plant is discovered, it can be readily removed, and discarded. Its planter can be treated while in place for receiving a replacement plant due to the ease with which that planter can be disconnected from the system, drained, etc.

The foregoing illustrative embodiments are well suited to the purposes of the invention. However, because they are readily susceptible to a range of modification and rearrangement, the invention should be construed broadly in accordance with its true spirit and scope.

I claim:

1. The method of supplying nutrient liquid to a plant growing system comprising a series of many planters that are essentially alike and that are disposed at a common level, the system including a supply line extending from a supply point to the planters in succession, including the steps of first supplying a first nutrient liquid to the supply line at the supply point under pressure so that the planters receive nutrient liquid to progressively lower levels in relation to their distances from the supply point due to attenuation of pressure along the supply line, interrupting the supply of liquid for equalizing the levels of liquid in the planters, thereafter supplying a second nutrient liquid different from the first at the supply point so that the planters receive such second nutrient liquid to progressively lower levels in relation to their distances from the supply point, and interrupting the supply of the second liquid for equalizing the levels of liquid in the planters, thereby to develop a range of different nutrient liquids in the successive planters.

2. The method as in claim 1 wherein the second nutrient liquid is chosen so that the resulting nutrient liquids in the series of planters is less than optimum in the planter at one end of the series and greater than optimum in the planter at the other end of the series.

3. The method as in claim 2 including the further step of analyzing the various nutrient liquids in the series of planters, the ensuing growths of plants in the series of planters being compared for ascertaining the optimum nutrient liquid.

4. The method as in claim 3 wherein a third nutrient liquid is thereafter added to the system as in the first liquid supplying step, the third nutrient liquid being chosen for at least partially developing the optimum nutrient liquid in the series of planters.

* * * * *